(12) United States Patent
Takatsuki

(10) Patent No.: US 6,449,104 B2
(45) Date of Patent: Sep. 10, 2002

(54) GAUSSIAN LENS

(75) Inventor: Akiko Takatsuki, Omiya (JP)

(73) Assignee: Fuji Photo Optical Co., LTD, Saitama (JP)

( * ) Notice: Subject to any disclaimer, the term of this patent is extended or adjusted under 35 U.S.C. 154(b) by 41 days.

(21) Appl. No.: 09/800,662

(22) Filed: Mar. 8, 2001

(30) Foreign Application Priority Data

Mar. 28, 2000 (JP) ...................................... 2000-089753

(51) Int. Cl.$^7$ ................................................ G02B 9/60
(52) U.S. Cl. ...................................... 359/767; 359/763
(58) Field of Search ................................ 359/763–764, 359/767–769, 756–757, 759–760, 754

(56) References Cited

U.S. PATENT DOCUMENTS

| 4,260,223 A | * | 4/1981 | Hamanishi | 359/740 |
| 4,396,256 A | * | 8/1983 | Fujie | 359/768 |
| 4,466,711 A | * | 8/1984 | Yokota | 359/760 |

FOREIGN PATENT DOCUMENTS

| JP | 62-87922 | 4/1987 |
| JP | 8-160293 | 6/1996 |

* cited by examiner

Primary Examiner—Jordan M. Schwartz
(74) Attorney, Agent, or Firm—Arnold International; Bruce Y. Arnold

(57) ABSTRACT

A Gaussian lens having no more than six lens elements of refractive power is formed of, in order from the object side: a first lens element which is biconvex, a second lens element which is a positive meniscus lens with its convex surface on the object side, a third lens element which is biconcave, a stop, a joined lens formed of a fourth lens element which is biconcave that is joined to a fifth lens element which is biconvex; and a sixth lens element having positive refractive power. Specified conditions are satisfied in order to provide a compact lens having an f-number $F_{NO}$ of 1.44 or less, an image angle $2\omega$ of 23.8 degrees or more, and wherein the various aberrations are favorably corrected. The Gaussian lens of the invention is intended for mounting in monitor cameras.

10 Claims, 3 Drawing Sheets

← Object Side

Image Side →

Spherical
Aberration (mm)

Astigmatism (mm)

Distortion (%)

Lateral
Color (mm)

Coma (mm)

Spherical
Aberration (mm)

Astigmatism (mm)

Distortion (%)

Lateral
Color (mm)

Coma (mm)

GAUSSIAN LENS

BACKGROUND OF THE INVENTION

Gaussian lenses are known for photographic use, in that they have a sufficiently long back focal length and provide excellent optical performance. Their typical structure is described in Japanese Patent Publication No. S62-87922 and Japanese Laid Open Patent Application No. H8-160293. Recently there has been an increased demand for monitor cameras that have a low $F_{NO}$ of 1.4 and are compact.

There have been attempts to use the Gaussian lens systems disclosed in the publications mentioned above in monitor cameras. However, the Gaussian lens system described in Japanese Patent Publication No. S62-87922 does not have its aberrations sufficiently corrected and it does not provide a sufficiently bright image, in that its $F_{NO}$ is 1.85. Although the Gaussian lens system described in Japanese Laid Open Patent Application No. H8-160293 provides a sufficiently bright image, this Gaussian lens has six components formed of seven lens elements. Thus, there is a need for a lens system that is more compact.

BRIEF SUMMARY OF THE INVENTION

The object of the present invention is to provide a compact Gaussian lens having an $F_{NO}$ of 1.44 or less, an image angle of 23.8 degrees or more, and wherein the various aberrations are favorably corrected. More specifically, the present invention relates to Gaussian lenses that may be mounted in monitor cameras.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
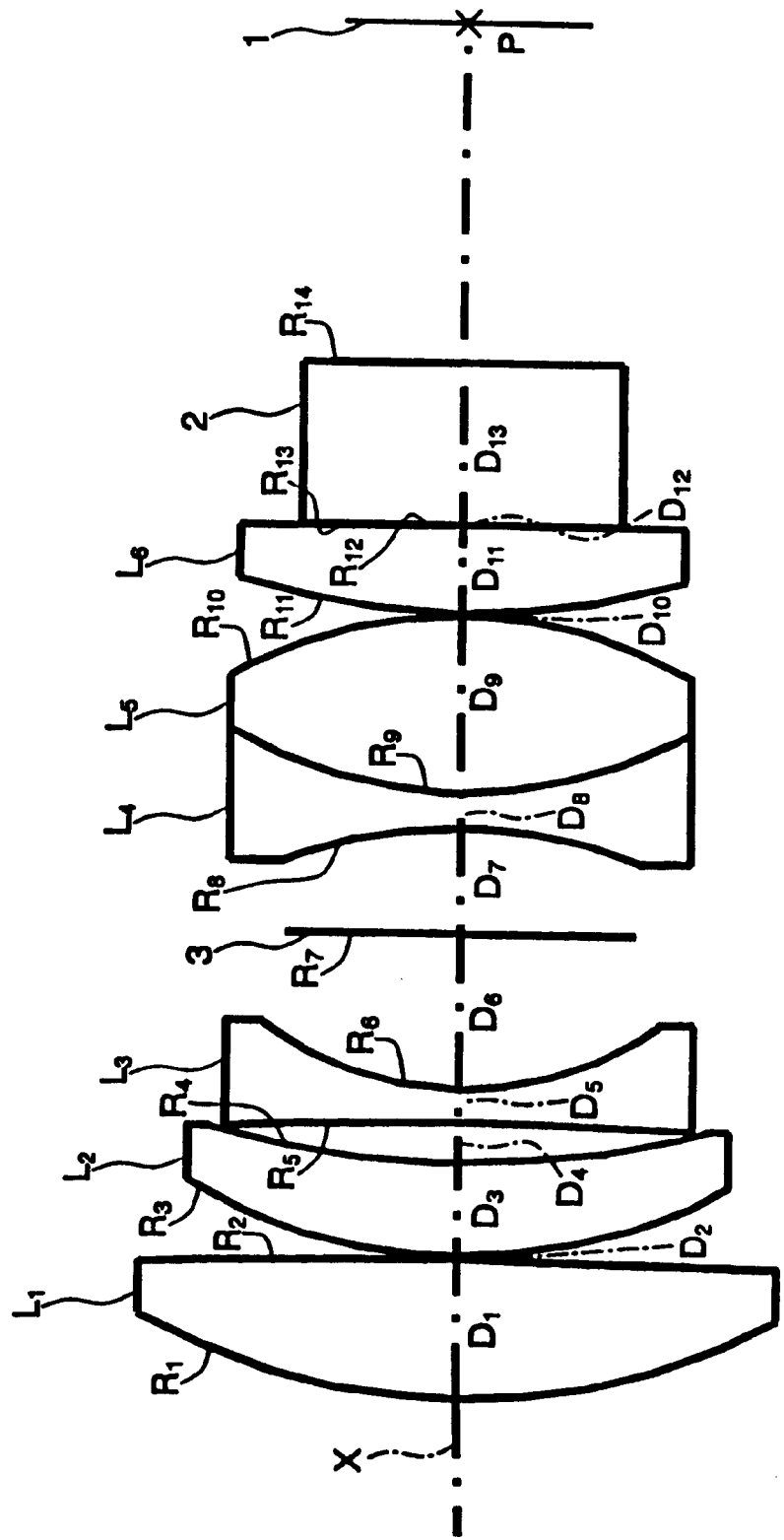
FIG. 1 shows the basic lens element configuration of Embodiments 1 and 2 of the present invention, and is also representative of Embodiments 3 and 4 of the invention except for the sign of the radius of curvature of the image side of the sixth lens element, in order from the object side.

FIG. 1 shows the basic lens element configuration of Embodiments 1–2 of the present invention, and is also representative of Embodiments 3 and 4 of the invention except for the sign of the radius of curvature of the image-side of the sixth lens element. The Gaussian lens according to the present invention is formed of, in order from the object side, a first lens element $L_1$ which is biconvex, a second lens element $L_2$ having a positive meniscus shape with its convex surface on the object side, a third lens element $L_3$ which is biconcave, a stop 3, a joined lens formed of a fourth lens element $L_4$ which is biconcave that is joined to a fifth lens element $L_5$ that is biconvex, and a sixth lens element $L_6$ that has positive refractive power. Light flux from an object traveling along the optical axis X enters the lens element $L_1$, exits lens element $L_6$, and is focused on a CCD detector array positioned at point P on the image surface 1. A filter member 2, which may include a low pass filter/infrared cut filter, is positioned before the image surface. Further, the following Conditions (1) to (6) are satisfied:

| | |
|---|---|
| $4.0<f_1/f_2<8.0$ | Condition (1) |
| $1.75<(N_5+N_6)/2$ | Condition (2) |
| $12.0<(\nu_5-\nu_4)$ | Condition (3) |
| $1.00<(R_5-R_4)/(R_5+R_4)<6.10$ | Condition (4) |
| $0.37<R_6/f<0.50$ | Condition (5) |
| $0.50<|R_8|/f<1.00$ | Condition (6) | where $f_1$ is the resultant focal length of the lens elements on the object side of the stop;

$f_2$ is the resultant focal length of the lens elements on the image side of the stop;

$N_5$ is the index of refraction of the fifth lens element, in order from the object side;

$N_6$ is the index of refraction of the sixth lens element, in order from the object side;

$\nu_5$ is the Abbe number of the fifth lens element, in order from the object side;

$\nu_4$ is the Abbe number of the fourth lens element, in order from the object side;

$R_4$ is the radius of curvature of the fourth surface, in order from the object side;

$R_5$ is the radius of curvature of the fifth surface, in order from the object side;

$R_6$ is the radius of curvature of the sixth surface, in order from the object side;

f is the focal length of the Gaussian lens; and $R_8$ is the radius of curvature of the eighth surface, in order from the object side.

In addition, it is preferred that the following Condition (7) also is satisfied:

| | |
|---|---|
| $-0.11<f/R_{12}$ | Condition (7) | where f is as defined above, and $R_{12}$ is the radius of curvature of the twelfth surface, in order from the object side.

The Gaussian lens according to the present invention ensures a bright image in that the $F_{NO}$ is 1.44 or less and the image angle is 23.8 degrees or more. Further, the various aberrations are favorably corrected with a compact structure having 5 lens components formed of 6 lens elements. The third lens element, by having its concave surface on the object side, allows the aperture to be large while reducing the spherical aberration.

The purposes of the above Conditions will now be discussed. Condition (1) ensures proper power distribution among the lens elements positioned on both sides of the stop in order to realize a large aperture. Exceeding the upper limit results in reducing the refractive power of the front lens group (i.e., the first to third lens elements, in order from the object side). This is advantageous for maintaining a sufficient back focal length. However, the relatively increased negative power of the third lens element excessively corrects spherical aberration. Not satisfying the lower limit makes it difficult to obtain a sufficiently large back focal length.

Condition (2) defines the refractive power of the positive lens elements that form the rear lens group (i.e., the fifth and sixth lens elements of among the fourth through sixth lens elements). Failure to satisfy the lower limit means that each lens element has a small radius of curvature, which causes the Petzval sum to increase. Spherical aberration will be insufficiently corrected, so that a large aperture will not be possible without reduced optical performance.

Condition (3) defines the Abbe numbers of the fourth and fifth lens elements which form a joined lens component. Failure to satisfy the lower limit reduces the corrective effect on chromatic aberration.

Condition (4) defines the refractive power of the air lens located between the second and third lens elements. Exceeding the upper limit enhances the divergent power of the air lens so that spherical aberration will be excessively corrected. On the other hand, not satisfying the lower limit causes coma to increase.

Conditions (5) and (6) determine the profile of the two concave surfaces located on either side of the stop. Exceeding the upper limit leads to insufficiently corrected spherical aberration and an increase in the Petzval sum. On the other hand, not satisfying the lower limit results in increased coma.

Condition (7) determines the refractive power of the convex surface on the image-side of the sixth lens element in order to ensure a proper back focal length. Failure to satisfy Condition (7) makes it difficult to obtain a sufficiently large back focal length.

Several embodiments of the invention will now be described in detail.

Embodiment 1

The Gaussian lens of Embodiment 1 is formed of a first lens element $L_1$ that is biconvex with surfaces of different radii of curvature, with the surface of smaller radius of curvature on the object side, a second lens element $L_2$ that is a positive meniscus lens with its convex surface on the object side, a third lens element $L_3$ that is biconcave with surfaces of different radii of curvature with the surface of smaller radius of curvature on the image side, a stop 3, a joined lens that is formed of a fourth lens element $L_4$ that is biconcave, a fifth lens element $L_5$ that is biconvex, and a sixth lens element $L_6$ that is biconvex having surfaces of different radii of curvature, with the surface of smaller radius of curvature on the object side. This embodiment satisfies Conditions (1)–(7) above.

Table 1 below lists the surface number #, in order from the object side, the radius of curvature R (in mm) of the surface, the on-axis spacing D (in mm) between surfaces, as well as the index of refraction $N_d$ and Abbe number $\upsilon_d$ (at the d line) of each lens element of this embodiment. In the middle portion of the table are listed the focal length f, the f-number $F_{NO}$, and the back focal length Bf (as measured from surface #14). In the bottom portion of the table are listed the values of Conditions (1)–(7).

TABLE 1

| # | R | D | $N_d$ | $\upsilon_d$ |
|---|---|---|---|---|
| 1 | 20.62 | 4.19 | 1.80125 | 47.9 |
| 2 | −981.39 | 0.08 | | |
| 3 | 17.23 | 2.80 | 1.84094 | 43.9 |
| 4 | 27.15 | 1.33 | | |
| 5 | −173.88 | 0.99 | 1.68422 | 31.1 |
| 6 | 10.41 | 4.68 | | |
| 7 | ∞ (stop) | 3.21 | | |
| 8 | −16.04 | 1.00 | 1.84665 | 23.8 |
| 9 | 24.19 | 5.35 | 1.80439 | 39.6 |
| 10 | −15.64 | 0.09 | | |
| 11 | 23.19 | 2.86 | 1.83400 | 37.1 |
| 12 | −251.07 | 0.00 | | |
| 13 | ∞ | 5.00 | 1.51680 | 64.2 |
| 14 | ∞ | | | | f = 25.78 mm  $F_{NO}$ = 1.44  Bf = 11.24 mm

Condition (1) value: $f_1/f_2$ = 4.02
Condition (2) value: $(N_5 + N_6)/2$ = 1.82
Condition (3) value: $\upsilon_5 - \upsilon_4$ = 15.8
Condition (4) value: $(R_5 - R_4)/(R_5 + R_4)$ = 1.37
Condition (5) value: $R_6/f$ = 0.40
Condition (6) value: $|R_8|/f$ = 0.62
Condition (7) value: $f/R_{12}$ = −0.103

As is shown in the middle portion of Table 1, the focal length f of the Gaussian lens is 25.78 mm, the f-number $F_{NO}$ is 1.44, and the back focal length Bf is 11.24 mm. As is apparent from comparing the values shown in the bottom portion of Table 1 with the Conditions (1)–(7) above, Conditions (1) to (7) are all satisfied. Also, the image angle 2ω of this embodiment is 24.2 degrees.

Figure 2A:
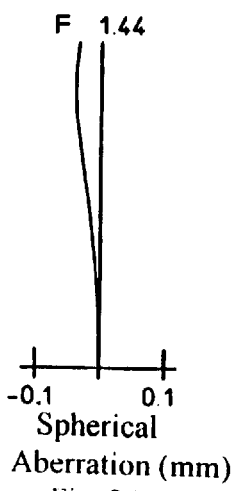
FIGS. 2A–2E show the spherical aberration, astigmatism, distortion, lateral color, and coma, respectively, of Embodiment 1 of the invention.
Figure 2B:
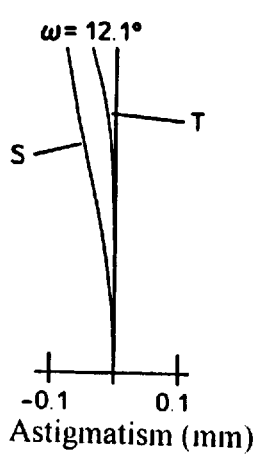
Figure 2C:
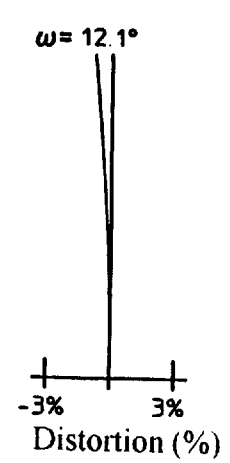
Figure 2D:
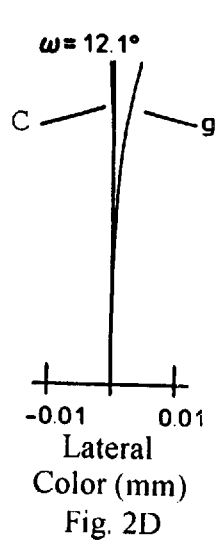
Figure 2E:
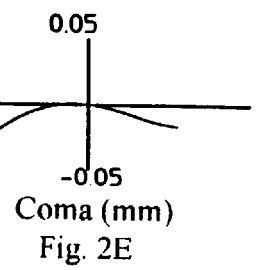

FIGS. 2A–2E show the spherical aberration, astigmatism, distortion, lateral color, and coma, respectively, of the Gaussian lens of Embodiment 1. In each figure ω is the half-image angle. In FIG. 2B the astigmatism is shown for both the sagittal S and tangential T directions. In FIG. 2D, the lateral color is shown for both the C and g lines. As is apparent from these figures, the various aberrations are favorably corrected for this embodiment.

Embodiment 2

The Gaussian lens of Embodiment 2 has the same basic lens element configuration as that of Embodiment 1.

Table 2 below lists the surface number #, in order from the object side, the radius of curvature R (in mm) of the surface, the on-axis spacing D (in mm) between surfaces, as well as the index of refraction $N_d$ and the Abbe number $\upsilon_d$ (at the d line) of each lens element of this embodiment. In the middle portion of the table are listed the focal length f, the f-number $F_{NO}$, and back focal length Bf (as measured from surface # 14). In the bottom portion of the table are listed the values of Conditions (1)–(7).

TABLE 2

| # | R | D | $N_d$ | $\upsilon_d$ |
|---|---|---|---|---|
| 1 | 20.70 | 4.17 | 1.77250 | 49.6 |
| 2 | −889.46 | 0.08 | | |
| 3 | 15.70 | 2.96 | 1.77250 | 49.6 |
| 4 | 21.86 | 1.49 | | |
| 5 | −3928.11 | 0.98 | 1.66680 | 33.0 |
| 6 | 10.40 | 4.79 | | |
| 7 | ∞ (stop) | 4.91 | | |
| 8 | −13.54 | 0.98 | 1.74076 | 27.8 |
| 9 | 12.33 | 5.56 | 1.70153 | 41.2 |
| 10 | −13.98 | 0.06 | | |

TABLE 2-continued

| # | R | D | $N_d$ | $v_d$ |
|---|---|---|---|---|
| 11 | 20.10 | 2.92 | 1.83480 | 42.7 |
| 12 | −3108.03 | 0.00 | | |
| 13 | ∞ | 5.00 | 1.51680 | 64.2 |
| 14 | ∞ | | | |
| | f = 26.90 mm | $F_{NO}$ = 1.44 | Bf = 10.97 mm | |

Condition (1) value: $f_1/f_2$ = 4.04
Condition (2) value: $(N_5 + N_6)/2$ = 1.77
Condition (3) value: $v_5 - v_4$ = 13.4
Condition (4) value: $(R_5 - R_4)/(R_5 + R_4)$ = 1.01
Condition (5) value: $R_6/f$ = 0.39
Condition (6) value: $|R_8|/f$ = 0.50
Condition (7) value: $f/R_{12}$ = −0.009

As is shown in the middle portion of Table 2, the focal length f of the Gaussian lens is 26.90 mm, the f-number $F_{NO}$ is 1.44, and the back focal length Bf is 10.97 mm. As is apparent from comparing the values shown in the bottom portion of Table 2 with the Conditions (1)–(7) above, Conditions (1) to (7) are all satisfied. Also, the image angle 2ω of this embodiment is 24.8 degrees.

Figure 3A:
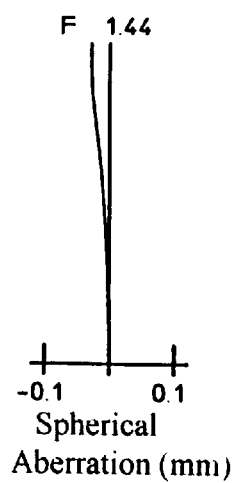
FIGS. 3A–3E show the spherical aberration, astigmatism, distortion, lateral color, and coma, respectively, of Embodiment 2 of the invention.
Figure 3B:
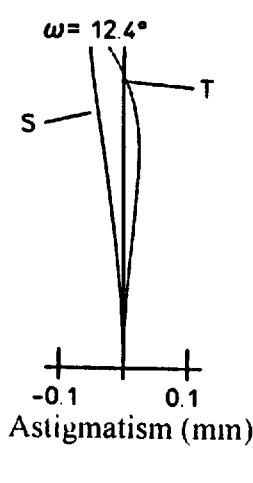
Figure 3C:
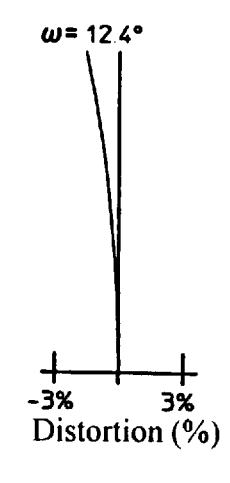
Figure 3D:
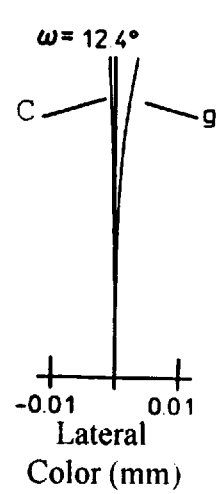
Figure 3E:
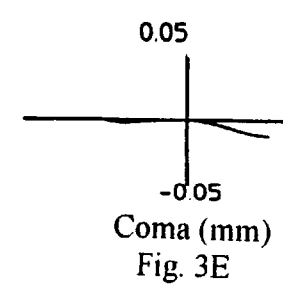

FIGS. 3A–3E show the spherical aberration, astigmatism, distortion, lateral color, and coma, respectively, of the Gaussian lens of Embodiment 2. In each figure ω is the half-image angle. In FIG. 3B the astigmatism is shown for both the sagittal S and tangential T directions. In FIG. 3D, the lateral color is shown for both the C and g lines. As is apparent from these figures, the various aberrations are favorably corrected for this embodiment.

Embodiment 3

The Gaussian lens of this embodiment has nearly the same basic lens element configuration as that of Embodiments 1 and 2 except, in this embodiment, the sixth lens element $L_6$ has a positive meniscus shape with its convex surface on the object side.

Table 3 below lists the surface number #, in order from the object side, the radius of curvature R (in mm) of the surface, the on-axis spacing D (in mm) between surfaces, as well as the index of refraction $N_d$ and the Abbe number $v_d$ (at the d line) of each lens element of this embodiment. In the middle portion of the table are listed the focal length f, the f-number $F_{NO}$, and back focal length Bf (as measured from surface #14). In the bottom portion of the table are listed the values of Conditions (1)–(7).

TABLE 3

| # | R | D | $N_d$ | $v_d$ |
|---|---|---|---|---|
| 1 | 22.56 | 4.18 | 1.78826 | 49.2 |
| 2 | −175.06 | 0.09 | | |
| 3 | 20.95 | 4.01 | 1.84013 | 44.0 |
| 4 | 29.72 | 1.55 | | |
| 5 | −41.62 | 0.99 | 1.70025 | 29.9 |
| 6 | 12.39 | 4.33 | | |
| 7 | ∞ (stop) | 3.03 | | |
| 8 | −21.79 | 0.99 | 1.78194 | 25.9 |
| 9 | 31.57 | 4.67 | 1.84114 | 43.9 |
| 10 | −16.65 | 0.08 | | |
| 11 | 23.11 | 2.70 | 1.84108 | 43.9 |
| 12 | 163.85 | 0.00 | | |
| 13 | ∞ | 5.00 | 1.51680 | 64.2 |
| 14 | ∞ | | | |
| | f = 25.78 mm | $F_{NO}$ = 1.44 | Bf = 11.25 mm | |

Condition (1) value: $f_1/f_2$ = 7.88
Condition (2) value: $(N_5 + N_6)/2$ = 1.84
Condition (3) value: $v_5 - v_4$ = 18.0
Condition (4) value: $(R_5 - R_4)/(R_5 + R_4)$ = 6.00
Condition (5) value: $R_6/f$ = 0.48
Condition (6) value: $|R_8|/f$ = 0.85
Condition (7) value: $f/R_{12}$ = 0.157

As is shown in the middle portion of Table 3, the focal length f of the Gaussian lens is 25.78 mm, the f-number $F_{NO}$ is 1.44, and the back focal length Bf is 11.25 mm. As is apparent from comparing the values shown in the bottom portion of Table 3 with the Conditions (1)–(7) above, Conditions (1) to (7) are all satisfied. Also, the image angle 2ω of this embodiment is 24.2 degrees.

Figures 4A, 4B, 4C, 4D:
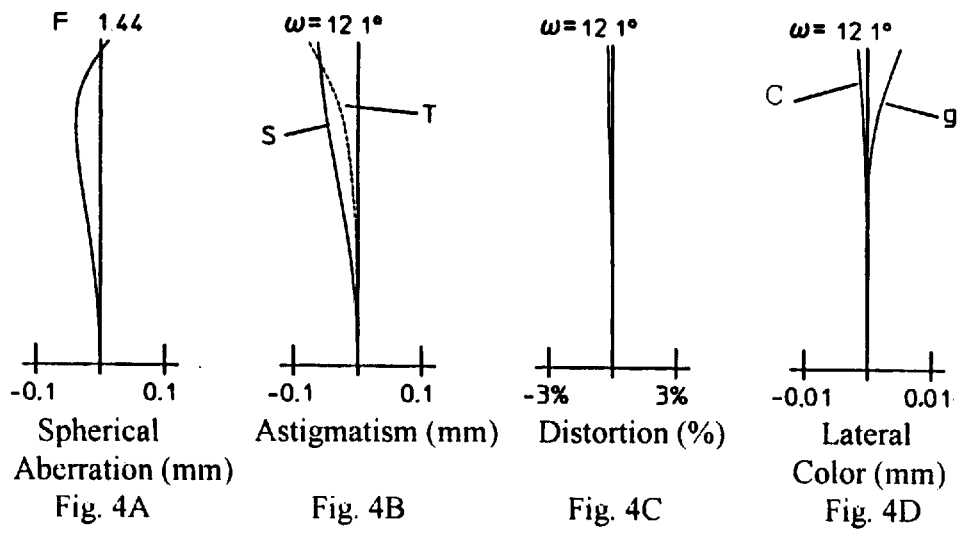
FIGS. 4A–4E show the spherical aberration, astigmatism, distortion, lateral color, and coma, respectively, of Embodiment 3 of the invention.
Figure 4E:
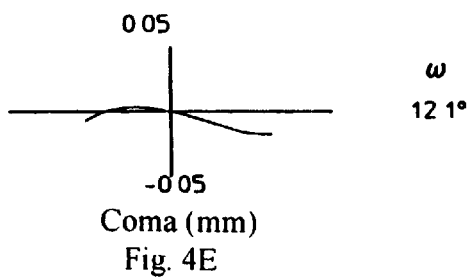

FIGS. 4A–4E show the spherical aberration, astigmatism, distortion, lateral color, and coma, respectively, of the Gaussian lens of Embodiment 3. In each figure Ω is the half-image angle. In FIG. 4B the astigmatism is shown for both the sagittal S and tangential T directions. In FIG. 4D, the lateral color is shown for both the C and g lines. As is apparent from these figures, the various aberrations are favorably corrected for this embodiment.

Embodiment 4

The Gaussian lens of Embodiment 4 has the same basic lens element configuration as that of Embodiment 3.

Table 4 below lists the surface number #, in order from the object side, the radius of curvature R (in mm) of the surface, the on-axis spacing D (in mm) between surfaces, as well as the index of refraction $N_d$ and the Abbe number $v_d$ (at the d line) of each lens element of this embodiment. In the middle portion of the table are listed the focal length f, the f-number $F_{NO}$, and back focal length Bf (as measured from surface # 14). In the bottom portion of the table are listed the values of Conditions (1)–(7).

TABLE 4

| # | R | D | $N_d$ | $v_d$ |
|---|---|---|---|---|
| 1 | 21.02 | 4.13 | 1.84614 | 43.4 |
| 2 | −668.48 | 0.08 | | |
| 3 | 16.22 | 2.77 | 1.84662 | 43.3 |
| 4 | 20.56 | 1.61 | | |
| 5 | −127.07 | 0.98 | 1.73308 | 28.3 |
| 6 | 10.41 | 4.72 | | |
| 7 | ∞ (stop) | 5.75 | | |
| 8 | −25.76 | 1.00 | 1.74076 | 27.8 |
| 9 | 13.11 | 5.76 | 1.72000 | 42.0 |
| 10 | −15.13 | 0.09 | | |
| 11 | 16.37 | 2.73 | 1.83480 | 42.7 |
| 12 | 35.21 | 0.00 | | |
| 13 | ∞ | 5.00 | 1.51680 | 64.2 |
| 14 | ∞ | | | |
| | f = 26.62 mm | $F_{NO}$ = 1.44 | Bf = 11.15 mm | |

Condition (1) value: $f_1/f_2$ = 7.99
Condition (2) value: $(N_5 + N_6)/2$ = 1.78
Condition (3) value: $v_5 - v_4$ = 14.2
Condition (4) value: $(R_5 - R_4)/(R_5 + R_4)$ = 1.39
Condition (5) value $R_6/f$ = 0.39
Condition (6) value: $|R_8|/f$ = 0.97
Condition (7) value: $f/R_{12}$ = 0.756

As shown in the middle portion of Table 4, the focal length f of the Gaussian lens is 26.62 mm, the f-number $F_{NO}$ is 1.44, and the back focal length Bf is 11.15 mm. As is apparent from comparing the values shown in the bottom portion of Table 4 with the Conditions (1)–(7) above, Conditions (1) to (7) are all satisfied. Also, the image angle 2ω of this embodiment is 23.8 degrees.

Figures 5A, 5B, 5C, 5D:
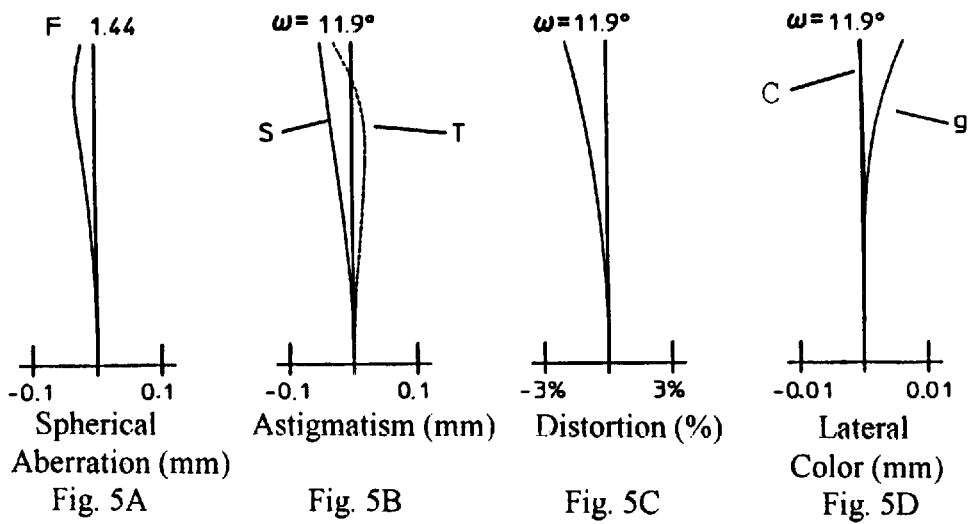
FIGS. 5A–5E show the spherical aberration, astigmatism, distortion, lateral color, and coma, respectively, of Embodiment 4 of the invention.
Figure 5E:
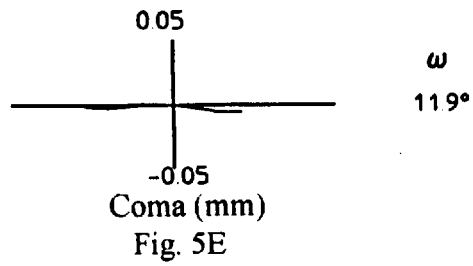

FIGS. 5A–5E show the spherical aberration, astigmatism, distortion, lateral color, and coma, respectively, of the Gaussian lens of Embodiment 4. In each figure ω is the half-image angle. In FIG. 5B the astigmatism is shown for both the sagittal S and tangential T directions. In FIG. 5D, the lateral color is shown for both the C and g lines. As is apparent from these figures the various aberrations are favorably corrected for this embodiment.

The invention being thus described, it will be obvious that the same may be varied in many ways. For example, the radii of curvature R and spacings D may be readily scaled so as to provide a Gaussian lens of a desired focal length. A cover glass can be inserted between the Gaussian lens and the image surface (i.e., the location of the solid-state detector array). Also, a a filter member 2, which may include a low pass filter and/or an infrared cut filter, may be inserted between the Gaussian lens and the image surface. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A Gaussian lens having no more than six lens elements of refractive power comprising, in order from the object side:
    a first lens element which is biconvex;
    a second lens element which is a positive meniscus lens with its convex surface on the object side;
    a third lens element which is biconcave;
    a stop;
    a joined lens consisting of a fourth lens element which is biconcave and joined to a fifth lens element which is biconvex; and
    a sixth lens element having positive refractive power.

2. The Gaussian lens of claim 1, wherein the following conditions are satisfied:

$4.0 < f_1/f_2 < 8.0$ $1.75 < (N_5+N_6)/2$ $12.0 < (v_5-v^4)$ $1.00 < (R_5-R_4)/(R_5+R_4) < 6.10$ $0.37 < R_6/f < 0.50$ $0.50 < |R_8|/f < 100$ where
    $f_1$ is the resultant focal length of the lens elements located on the object-side of the stop,
    $f_2$ is the resultant focal length of the lens elements located on the image-side of the stop,
    $N_5$ is the index of refraction of the fifth lens element,
    $N_6$ is the index of refraction of the sixth lens element,
    $v_5$ is the Abbe number of fifth lens element,
    $v_4$ is the Abbe number of fourth lens element,
    $R_5$ is the radius of curvature of the object-side surface of the third lens element,
    $R_4$ is the radius of curvature of the image-side surface of the second lens element,
    $R_6$ is the radius of curvature of the image-side surface of the third lens element,
    f is the focal length of the Gaussian lens, and
    $R_8$ is the radius of curvature of the image-side surface of the fourth lens element.

3. The Gaussian lens of claim 2, wherein the following condition is also satisfied:

$-0.11 < f/R_{12}$ where
    $R_{12}$ is the radius of curvature of the image-side surface of the sixth lens element.

4. The Gaussian lens of claim 1, wherein the following condition is satisfied:

$4.0 < f_1/f_2 < 8.0$ where
    $f_1$ is the resultant focal length of the lens elements located on the object-side of the stop; and
    $f_2$ is the resultant focal length of the lens elements located on the image-side of the stop.

5. The Gaussian lens of claim 1, wherein the following condition is satisfied:

$1.75 < (N_5+N_6)/2$ where
    $N_5$ is the index of refraction of the fifth lens element, and
    $N_6$ is the index of refraction of the sixth lens element.

6. The Gaussian lens of claim 1, wherein the following condition is satisfied:

$12.0 < (v_5-v_4)$ where
    $v_5$ is the Abbe number of fifth lens element, and
    $v_4$ is the Abbe number of fourth lens element.

7. The Gaussian lens of claim 1, wherein the following condition is satisfied:

$1.00 < (R_5-R_4)/(R_5+R_4) < 6.10$ where
    $R_5$ is the radius of curvature of the object-side surface of the third lens element, and
    $R_4$ is the radius of curvature of the image-side surface of the second lens element.

8. The Gaussian lens of claim 1, wherein the following condition is satisfied:

$0.37 < R_6/f < 0.50$ where
    $R_6$ is the radius of curvature of the image-side surface of the third lens element, and
    f is the focal length of the Gaussian lens.

9. The Gaussian lens of claim 1, wherein the following condition is satisfied:

$0.50 < |R_8|/f < 1.00$ where
- $R_8$ is the radius of curvature of the image-side surface of the fourth lens element, and
- f is the focal length of the Gaussian lens.

10. The Gaussian lens of claim 1, wherein the following condition is satisfied:

$$-0.11 < f/R_{12}$$

where
- f is the focal length of the Gaussian lens, and
- $R_{12}$ is the radius of curvature of the image-side surface of the sixth lens element.

* * * * *

UNITED STATES PATENT AND TRADEMARK OFFICE
CERTIFICATE OF CORRECTION

PATENT NO. : 6,449,104 B2
DATED : September 10, 2002
INVENTOR(S) : Takatsuki

It is certified that error appears in the above-identified patent and that said Letters Patent is hereby corrected as shown below:

Column 3,
Line 65, change "$F_{NO}$," to -- $F_{NO}$, --;

Column 4,
Line 52, change "$F_{NO}$," to -- $F_{NO}$, --;

Column 5,
Line 48, change "$F_{NO}$," to -- $F_{NO}$, --;

Column 6,
Line 23, change "figure $\Omega$" to -- figure $\omega$ --;
Lines 39 and 67, change "$F_{NO}$," to -- $F_{NO}$, --; and Column 7,
Line 49, change "$12.0 < (v_5 - v^4)$" to -- $12.0 < (v_5 - v_4)$ --.

Signed and Sealed this

Twenty-eighth Day of January, 2003

JAMES E. ROGAN
*Director of the United States Patent and Trademark Office*